Patented Mar. 15, 1938

2,110,879

UNITED STATES PATENT OFFICE

2,110,879

CATALYTIC HYDRATION OF OLEFINES TO ALCOHOLS

Walter Philip Joshua, Cheam, Herbert Muggleton Stanley, Tadworth, and John Blair Dymock, Sutton, England No Drawing. Application January 19, 1934, Serial No. 707,416. In Great Britain February 8, 1933

9 Claims. (Cl. 260—156)

The present invention relates to the combination of olefines and water vapour to form the corresponding alcohols with the aid of suitable catalysts. The mechanical stability of such catalysts is of considerable importance when high partial pressures of steam are used.

According to the present invention the hydration of the olefines is effected with the aid of a catalyst rendered mechanically stable without its activity being impaired by incorporating with the active catalytic material during the preparation of the catalysts organic substances capable of forming true or colloidal solutions in water, and which when subjected to relatively elevated temperatures in admixture with the catalytic material will leave as residue in the catalyst substantially carbon only. The subjection of the mixture to the elevated temperature may be effected in the presence of oxygen containing gases. The amount of added organic substances is preferably not more than 20 per cent by weight of the catalytic material employed in the preparation of the catalyst.

As examples of suitable organic substances capable of forming true solutions or colloidal solutions in water and of leaving substantially nothing but carbon in the catalyst finally obtained for use, we may mention the following:—sucrose, starch and other carbohydrates such as glucose, fructose, and molasses; also gelatine, pectin and the like, and higher alcohols such as glycerol and mannitol.

The incorporation of the organic material is particularly applicable to catalysts consisting of phosphates of active elements and containing an excess of phosphoric acid over and above the amount required to form the orthophosphate of the element or elements employed. When attempt is made to use catalytic material containing relatively large amounts of phosphoric acid under conditions of high partial steam pressure such as is required at total working pressures between 20 and 100 atmospheres without first preparing the material as above described, it tends to break down mechanically. The mechanical stability of such material could be improved by decreasing the amount of phosphoric acid present in it, but we have found that this reduces materially the activity of the material and diminishes the amount of alcohol which can be produced per unit volume of such material.

The following examples illustrate the manner in which the invention may be carried into effect and the results obtained by using the catalysts described.

Example I

A catalyst comprising one gram molecule of manganese carbonate, half a gram molecule of boric anhydride and four gram molecules of phosphoric acid was evaporated down to dryness on an air bath in the presence of 35 grams of sucrose. The resulting product was ground and baked at 200° C. until no odor of caramel was perceptible. The dry friable product was ground up with 2 per cent of linseed oil as binder and tabletted. The tablets were baked at 200° C.

This catalyst when employed at a temperature of 280° C. for the catalytic conversion of ethylene into ethyl alcohol by means of steam, using a total pressure of 40 atmospheres, i. e. 10 atmospheres of steam and 30 atmospheres of ethylene, remained mechanically stable, and produced a yield of ethyl alcohol of 248 grams per litre of catalyst per hour.

A catalyst of similar composition but without the inclusion of sucrose could not have been produced in a form sufficiently friable to allow of tabletting and would under the above pressure conditions have changed to a mud within about two hours and would not have given such high yields of alcohol.

Example II

A catalyst comprising one gram molecule of calcium oxide, half a gram molecule of boric anhydride, and four gram molecules of phosphoric acid was evaporated down to dryness on an air bath in the presence of 30 gram molecules of sucrose. The mass was treated in the same way as in Example I, but tabletted with 3 per cent of linseed oil as binder.

When used under the same temperature and pressure conditions as in Example I, the catalyst remained mechanically stable and yielded, per litre of catalyst, 257 grams of ethyl alcohol per hour.

Example III

A catalyst comprising one gram molecule manganese carbonate, half a gram molecule of boric anhydride and 3.6 gram molecules of phosphoric acid was evaporated down to dryness in the presence of 5 per cent glycerine, calculated on the dry weight of catalyst. The mass was treated as in Example II, being tabletted with 3 per cent of linseed oil as binder.

The output of ethyl alcohol from ethylene and steam under similar temperature and pressure conditions to those used in Examples I and II was 110.7 grams per hour.

What we claim is:—

1. The process of catalytically converting olefines and water vapor into alcohols which comprises passing said olefines and water vapor over a phosphate catalyst wherein excess phosphoric acid is incorporated, said catalyst being made by incorporating with the active catalytic material an organic material leaving when heated substantially only a carbon skeleton without deteriorating the catalyst and capable of forming a true or colloidal solution in water and then subjecting said catalyst to an elevated temperature so that said organic material will leave in the catalyst as a residue substantially only carbon whereby a carbonaceous skeleton is formed in situ which will give the necessary mechanical stability for withstanding the conditions of said process.

2. The process of catalytically converting olefines and water vapor into alcohols which comprises passing said olefines and water vapor over a hydration catalyst wherein an excess of a mineral acid is incorporated, said catalyst being made by incorporating with the active catalytic material an organic material leaving when heated substantially only a carbon skeleton without deteriorating the catalyst and capable of forming a true or colloidal solution in water and then subjecting said catalyst to an elevated temperature so that said organic material will leave in the catalyst as a residue substantially only carbon whereby a carbonaceous skeleton is formed in situ which will give the necessary mechanical stability for withstanding the conditions of said process.

3. The process of catalytically converting olefines and water vapor into alcohols which comprises passing said olefines and water vapor over a phosphate catalyst wherein excess phosphoric acid is incorporated, said catalyst being made by incorporating with the active catalytic material an organic material leaving when heated substantially only a carbon skeleton without deteriorating the catalyst and capable of forming a true or colloidal solution in water and then subjecting said catalyst to an elevated temperature in the presence of an oxygen containing gas so that said organic material will leave in the catalyst as a residue substantially only carbon whereby a carbonaceous skeleton is formed in situ which will give the necessary mechanical stability for withstanding the conditions of said process.

4. The process of catalytically converting olefines and water vapor into alcohols which comprises passing said olefines and water vapor over a phosphate catalyst wherein excess phosphoric acid is incorporated, said catalyst being made by incorporating with the active catalytic material an organic material leaving when heated substantially only a carbon skeleton without deteriorating the catalyst and capable of forming a true or colloidal solution in water, the amount of said organic material being up to 20% of the weight of the active catalytic material used and then subjecting said catalyst to an elevated temperature so that said organic material will leave in the catalyst as a residue substantially only carbon whereby a carbonaceous skeleton is formed in situ which will give the necessary mechanical stability for withstanding the conditions of said process.

5. The process of catalytically converting olefines and water vapor into alcohols which comprises passing said olefines and water vapor over a phosphate catalyst wherein excess phosphoric acid is incorporated, said catalyst being made by incorporating with the active catalytic material a carbohydrate and then subjecting said catalyst to an elevated temperature so that said carbohydrate will leave in the catalyst as a residue substantially only carbon whereby a carbonaceous skeleton is formed in situ which will give the necessary mechanical stability for withstanding the conditions of said process.

6. The process of catalytically converting olefines and water vapor into alcohols which comprises passing said olefines and water vapor over a phosphate catalyst wherein excess phosphoric acid is incorporated, said catalyst being made by incorporating with the active catalytic material a higher alcohol and then subjecting said catalyst to an elevated temperature so that said higher alcohol will leave in the catalyst as a residue substantially only carbon whereby a carbonaceous skelton is formed in situ which will give the necessary mechanical stability for withstanding the conditions of said process.

7. The process of catalytically converting olefines and water vapor into alcohols which comprises passing said olefines and water vapor over a phosphate catalyst wherein excess phosphoric acid is incorporated, said catalyst being made by incorporating with the active catalytic material gelatin and then subjecting said catalyst to an elevated temperature so that said gelatin will leave in the catalyst as a residue substantially only carbon whereby a carbonaceous skeleton is formed in situ which will give the necessary mechanical stability for withstanding the conditions of said process.

8. The process of catalytically converting olefines and water vapor into alcohols which comprises passing said olefines and water vapor over a phosphate catalyst wherein excess phosphoric acid is incorporated, said catalyst being made by incorporating with the active catalytic material glycerol and then subjecting said catalyst to an elevated temperature so that said glycerol will leave in the catalyst as a residue substantially only carbon whereby a carbonaceous skeleton is formed in situ which will give the necessary mechanical stability for withstanding the conditions of said process.

9. The process of catalytically converting olefines and water vapor into alcohols which comprises passing said olefines and water vapor over a basic radical wherein phosphoric acid is incorporated in excess of that required to form the ortho phosphate of said radical, said catalyst being made by incorporating with the active catalytic material an organic material leaving when heated substantially only a carbon skeleton without deteriorating the catalyst and capable of forming a true or colloidal solution in water and then subjecting said catalyst to an elevated temperature so that said organic material will leave in the catalyst as a residue substantially only carbon whereby a carbonaceous skeleton is formed in situ which will give the necessary mechanical stability for withstanding the conditions of said process.

WALTER PHILIP JOSHUA.
HERBERT MUGGLETON STANLEY.
JOHN BLAIR DYMOCK.